United States Patent
Kiesewetter et al.

(10) Patent No.: US 6,943,247 B2
(45) Date of Patent: Sep. 13, 2005

(54) BUILDING MATERIAL COMPOSITIONS

(75) Inventors: René Kiesewetter, Wietzendorf (DE); Hartwig Schlesiger, Fallingbostel (DE); Martin Morning, Bomlitz (DE); Gunter Weber, Fallingbostel (DE); Werner Lange, Visselhövede (DE)

(73) Assignee: Wolff Walsrode AG, Walsrode (DE)

( * ) Notice: Subject to any disclaimer, the term of this patent is extended or adjusted under 35 U.S.C. 154(b) by 74 days.

(21) Appl. No.: 09/808,316

(22) Filed: Mar. 14, 2001

(65) Prior Publication Data

US 2001/0033941 A1 Oct. 25, 2001

(30) Foreign Application Priority Data

Mar. 18, 2000 (DE) ........................................ 100 13 577

(51) Int. Cl.$^7$ .............................................. C08B 11/00
(52) U.S. Cl. ............................ 536/84; 536/85; 536/86; 536/90; 536/123.1
(58) Field of Search .............................. 536/56, 58, 84, 536/86, 90, 91, 102, 111, 115, 123, 123.1; 106/726, 730, 780, 805, 501.1; 524/35, 37, 38, 39, 42, 43, 44, 45, 46, 47, 50, 51, 55; 241/18, DIG. 14

(56) References Cited

U.S. PATENT DOCUMENTS

| | | |
|---|---|---|
| 4,076,935 A | 2/1978 | Eichenseer et al. ............ 536/86 |
| 4,415,124 A | 11/1983 | Carduck et al. ............... 241/28 |
| 4,979,681 A | 12/1990 | Donges et al. ................. 241/17 |
| 5,047,086 A | 9/1991 | Hayakawa et al. .......... 106/731 |
| 5,057,896 A | 10/1991 | Gotou ........................... 357/49 |
| 5,234,968 A | 8/1993 | Debus et al. .................. 524/42 |
| 5,372,964 A | 12/1994 | Gotou ........................... 437/52 |
| 5,749,964 A | 5/1998 | Mann .......................... 106/805 |
| 6,320,043 B1 | 11/2001 | Weber et al. .................. 536/84 |
| 2001/0034441 A1 | 10/2001 | Schlesiger et al. ............ 536/86 |

FOREIGN PATENT DOCUMENTS

| | | |
|---|---|---|
| DE | 195 41 945 | 4/1997 |
| EP | 0 835 881 | 2/2001 |
| GB | 2 262 527 A | 6/1993 |
| JP | 54074855 | 6/1979 |

*Primary Examiner*—Paul Marcantoni
(74) *Attorney, Agent, or Firm*—Joseph C. Gil; James R. Franks

(57) ABSTRACT

Described is a building material composition prepared from or having added thereto a particulate material selected from particulate polysaccharides or particulate polysaccharide derivatives. The particulate material of the building material composition is prepared by a method comprising: (a) forming a feed composition comprising a member selected from the group consisting of polysaccharides and polysaccharide derivatives, and 35 wt. % to 99 wt. % of water, based on the total weight of the feed composition, wherein said member is at least one of swelled and dissolved in the feed composition; (b) contacting, in a mill, the feed composition with a gas stream, thereby converting simultaneously the water of said feed composition into water vapor, and said member of said feed composition into a solid state form of finely particulate material; (c) separating the particulate material from the gas stream; and (d) optionally drying the particulate material. Examples of building material compositions according to the present invention include tile adhesives and joint fillers.

8 Claims, No Drawings

BUILDING MATERIAL COMPOSITIONS

FIELD OF THE INVENTION

The present invention relates to building material compositions prepared from or having added thereto a particulate material selected from particulate polysaccharides or particulate polysaccharide derivatives, in particular particulate polysaccharide ethers, and preferably particulate cellulose ethers. The particulate material is prepared by contacting an aqueous feed composition of a swollen and/or dissolved member selected from polysaccharides or polysaccharide derivatives with a gas stream in a mill, followed by separating the formed particulate material from the gas stream, and optionally drying the separated particulate material. Building material compositions according to the present invention include, for example, manually and mechanically applied renders, tile adhesives, shotcrete compositions, screeds, cement extrudates, filler compositions and emulsion paints.

BACKGROUND OF THE INVENTION

Polysaccharides or polysaccharide ethers, in particular cellulose ethers, are used in many different application systems where they are of variable significance. Depending upon the nature of the cellulose ether and the concentration and molecular weight thereof, the products have a thickening action in their various formulations and exhibit differing thixotropic and/or pseudoplastic properties, so in turn controlling processing characteristics which vary depending upon the area of application (for example, use in foodstuffs, pharmaceuticals, cosmetics and others). See, for example, Ullmann's Encyclopedia of Industrial Chemistry, vol. 5A, Verlag Chemie, Weinheim/New York, 1986.

In cement and gypsum renders, cellulose ethers, in particular methylcellulose mixed ethers, control water requirements and consequently the processing life and rendering yield. Water retention determines processing characteristics such as for example pliability, consistency, plasticisation, tendency to adhere to smoothing tools and combability as well as sag and slippage resistance and slurry formation. The use of cellulose ethers moreover controls adhesion to the substrate and ensures reliable curing.

In cement extrusion, it is important, inter alia, that, even at elevated pressures, the building material compositions or mixtures remain dimensionally stable and retain good mouldability and moreover have adequate water retention, even at relatively high temperatures of approx. 40–50° C. Many different cellulose ethers, in particular methylcellulose (mixed) ethers, are added to the building material mixtures in order to achieve this.

The cellulose ethers used in tile adhesives must provide an adequate thickening action (consistency) and water retention. They also distinctly improve adhesion to the substrate and sag resistance. Tile adhesives formulated with cellulose ethers must exhibit not only sufficiently high slippage resistance but also very good tensile bond strength under differing conditions to which the tiles are exposed, even under critical conditions (for example, exposure to elevated temperatures of 70° C., exposure to freeze-thaw cycles, exposure to water).

Important properties for use in filler compositions are mixing and thickening behaviour during processing of the filler compositions. Applicational properties, such as for example good workability and sag resistance, of the filler compositions are established by the nature of the cellulose ether used and the associated rheological profile. Sufficiently high water retention is necessary in order to avoid cracking during processing.

When cellulose ethers are used in aqueous coating systems, such as for example emulsion paints, silicone resin paints and silicate paints, it is desirable that such use be accompanied by good applicational properties of the paint or of the dried film (for example, low tendency to splash, good paint surface, good pigment dispersion, elevated resistance to washing and scrub resistance and others). The cellulose ethers should additionally be distinguished by improved thickening performance, good storage stability in the paint, simple processing and environmentally friendly application.

SUMMARY OF THE INVENTION

In accordance with the present invention, there is provided a building material composition prepared from or having added thereto a particulate material selected from the group consisting of particulate polysaccharides and particulate polysaccharide derivatives, wherein the particulate material is prepared by a method comprising:

(a) forming a feed composition comprising a member selected from the group consisting of polysaccharides and polysaccharide derivatives, and 35 wt. % to 99 wt. % of water, based on the total weight of the feed composition, wherein said member is at least one of swelled and dissolved in the feed composition;

(b) contacting, in a mill, the feed composition with a gas stream, thereby converting simultaneously the water of said feed composition into water vapor, and said member of said feed composition into a solid state form of finely particulate material;

(c) separating the particulate material from the gas stream; and (d) optionally drying the particulate material.

Other than in the operating examples, or where otherwise indicated, all numbers expressing quantities of ingredients, reaction conditions, etc. used in the specification and claims are to be under stood as modified in all instance by the term "about." As used herein and in the claims, the symbol "%" means percent, and the term "wt. %" means weight percent or percent by weight.

DETAILED DESCRIPTION OF THE INVENTION

The polysaccharides or polysaccharide derivatives, preferably cellulose ethers, particularly preferably methylhydroxyethylcellulose ethers, used according to the invention exhibit, for example when used in renders, an improved water retention capacity in comparison with conventionally produced methylhydroxyethylcellulose ethers, especially under particularly critical conditions (for example, at 40° C.). When the products claimed according to the invention are used in tile adhesives, improved tensile bond strengths and/or more rapid onset of cure of the adhesive are achieved. When the building material composition is a cement extrusion prepared from particulate polysaccharides or polysaccharide derivatives according to the present invention, distinctly better plasticisation and dimensional stability together with reduced cracking of the extruded mouldings are observed. Typically, the advantages of the building material compositions according to the present invention are associated with technical or economic advantages for the user.

The building material compositions of the present invention may be prepared by methods that are well known to the skilled artisan. For example, the components of the composition, including the particulate polysaccharides or particulate polysaccharide derivatives, may be mixed together by means of impellers, cowls blades, media mills and extruders. The particulate polysaccharides or particulate polysaccharide derivatives may be added to the building material composition at any point during or throughout its preparation. The scope of the present invention is also inclusive of building material compositions that have particulate polysaccharides or particulate polysaccharide derivatives added thereto at a point in time after their initial preparation, but prior to their use.

In preparing the particulate polysaccharides and particulate polysaccharide derivatives used in the building material compositions of the present invention, the feed composition may comprise water in an amount preferably from 50 wt. % to 80 wt. %, and more preferably from 65 wt. % to 78 wt. %, the percent by weights being based on the total weight of the feed composition. The feed composition also typically comprises polysaccharides or polysaccharide derivatives in an amount typically from 1 wt. % to 65 wt. %, preferably from 20 wt. % to 50 wt. %, and more preferably from 22 wt. % to 35 wt. %, the percent weights being based on the total weight of the feed composition.

In an embodiment of the present invention, the particulate polysaccharides and particulate polysaccharide derivatives are prepared in a high rotary speed, gas stream impact mill. High rotary speed, gas stream impact mills that may be used to prepare the particulate polysaccharides and particulate polysaccharide derivatives include those that are well known to the skilled artisan. The gas stream that is passed through the mill, e.g., a high rotary speed, gas stream impact mill, is preferably a superheated stream of steam. The superheated stream of steam may comprise a mixture selected from: (i) steam and an inert gas, e.g., nitrogen; and (ii) steam and air. The superheated stream of steam typically has a steam content of from 40 wt. % to 99 wt. %, based on the total weight of the superheated stream of steam.

In comparison with the disclosed methods, as described for example in EP-A-0 049 815, EP-A-0 370 447, EP-A-0 348 046, EP-A-0 835 881, GB-A-2 262 527, the process by which the particulate polysaccharides and polysaccharide derivatives of the building material compositions of the present invention are prepared is distinctly more economic. During the process of preparing the particulate polysaccharides and polysaccharide derivatives, the superheated gas stream preferably is a superheated steam/inert gas mixture or a superheated steam/air mixture, and the energy input from grinding is in turn converted into thermal energy, which thus returns to the superheated gas stream and may accordingly be utilized.

Using the process described above, numerous polysaccharides, polysaccharide derivatives, in particular cellulose ethers with or without a thermal flocculation point, may be produced economically and used in the building material compositions of the present invention.

In accordance with the present invention, the polysaccharide derivatives, in particular cellulose ethers, are used in building material compositions, such as for example manually and mechanically applied renders, for example based on gypsum, hydrated lime or cement, mortars, tile adhesives, spraycrete compositions, floor levelling compositions, cement and lime/sandstone extrudates, jointing fillers and filler compositions as well as coating compositions, for example distempers, silicate, mineral, emulsion paints and aqueous or organo-soluble lacquer systems. However, use is not restricted to the above-stated preferred applications in the building materials sector.

In the above-recited building material compositions, the cellulose ethers are conventionally used in the range from 0.001–50 wt. %, preferably from 0.001–10 wt. %, based on the total dry weight of the building material composition. The quantity of the polysaccharide derivative, in particular cellulose ether, to be added to the building material composition, is here dependent upon the particular intended application. In gypsum-based rendering compositions, the quantity of cellulose ether to be added is conventionally in the range from 0.05 to 0.5 wt. %; in cement-based rendering compositions, the quantity is in the range from 0.02 to 0.3 wt. %, based on the total dry weight. The quantities to be added to filler compositions, tile adhesives and in cement extrusion applications are conventionally higher; for example, the quantity used in gypsum-based filler compositions is approx. 0.1 to 2 wt. % or 0.1 to 1 wt. % for cement-based filler compositions, based on the total dry weight.

In accordance with the present invention, both ionic and nonionic polysaccharides or polysaccharide derivatives, in particular polysaccharide ethers and esters, in particular cellulose ethers, having a thermal flocculation point and those without a thermal flocculation point may be used in the recited building material compositions. Particularly preferred cellulose ethers and cellulose esters which may be used in the building material compositions of the present invention, include those which have at least one or more of the substituents stated below (e.g., so-called binary or ternary mixed ethers). Examples of such substituents include, but are not limited to: hydroxyethyl, hydroxypropyl, hydroxybutyl, methyl, ethyl, propyl, benzyl, phosphonomethyl, phosphonoethyl, dihydroxypropyl, carboxymethyl, sulphomethyl, sulphoethyl, hydrophobic long-chain branched and unbranched alkyl residues, hydrophobic long-chain branched and unbranched alkylaryl residues or arylalkyl residues, N,N-diethylaminoalkyl and cationic or cationised residues as well as acetate, propionate, butyrate, lactate, nitrate and sulfate groups.

Polysaccharide derivatives, in particular polysaccharide ethers and esters that may be used in the building material compositions of the present invention include, but are not limited to those classes described as follows.

A) Cellulose derivatives may be used, in particular cellulose ethers, such as for example hydroxyalkylcelluloses {e.g., hydroxyethylcellulose (HEC), hydroxypropylcellulose (HPC) and hydroxypropylhydroxyethylcellulose (HPHEC)}; carboxy-alkylcelluloses {e.g., carboxymethylcellulose (CMC)}; carboxyalkylhydroxyalkylcelluloses {carboxymethylhydroxyethylcellulose (CMHEC) and carboxymethyl-hydroxypropylcellulose (CMHPC)}; sulphoalkylcelluloses {e.g., sulphoethylcellulose (SEC) and sulphopropylcellulose (SPC)}; carboxyalkylsulphoalkylcelluloses {e.g., carboxymethylsulphoethylcellulose (CMSEC) and carboxymethylsulphopropylcellulose (CMSPC)}; hydroxyalkylsulphoalkylcelluloses {e.g., hydroxyethylsulphoethylcellulose (HESEC), hydroxypropylsulphoethylcellulose (HPSEC) and hydroxyethylhydroxypropylsulphoethylcellulose (HEHPSEC)}; alkylhydroxyalkylsulphoalkylcelluloses {e.g., methylhydroxyethylsulphoethylcellulose (MHESEC), methylhydroxypropylsulphoethylcellulose (MHPSEC) and methylhydroxyethylhydroxypropylsulphoethylcellulose (MHEHPSEC)}; alkylcelluloses {e.g., methylcellulose (MC) and ethylcellulose (EC)}; alkylhydroxyalkylcellulose {e.g., methylhydroxyethylcellulose (MHEC), ethylhydroxyethylcellulose (EHEC), methylhydroxypropylcellulose (MHPC) and ethylhydroxypropylcellulose (EHPC)}; alkenylcelluloses and ionic and nonionic alkenylcellulose mixed ethers {e.g., allylcellulose, allylmethylcellulose, allylethylcellulose and carboxymethylallylcellulose)}; dialkylaminoalkylcelluloses {e.g., N,N-dimethylaminoethylcellulose and N,N-diethylaminoethylcellulose}; dialkylaminoalkylhydroxyalkylcelluloses {e.g., N,N-dimethylaminoethylhydroxyethylcellulose and N,N-dimethylaminoethylhydroxypropylcellulose}; aryl- and arylalkyl- and arylhydroxyalkylcelluloses {e.g., benzylcellulose, methylbenzylcellulose and benzylhydroxyethylcellulose}; as well as reaction products of the above-stated cellulose ethers with hydrophobically modified glycidyl ethers, which have alkyl residues with $C_3$ to $C_{15}$ carbon atoms or arylalkyl residues with $C_7$ to $C_{15}$ carbon atoms.

B) Starch and starch derivatives may be used, in particular starch ethers, particularly preferably starch ethers soluble in cold and hot water, such as for example oxidised, hydroxyalkylated, carboxyalkylated, alkylated, nitrogenous cationised or cationic starch ethers.

C) Galactomannans may be used, such as carob flour, guar and guar derivatives, in particular guar ethers, such as for example hydroxyethylguar, hydroxypropylguar, methylguar, ethylguar, methylhydroxyethylguar, methylhydroxypropylguar and carboxymethylguar.

D) Alginates and derivatives thereof may be used.

E) Physical blends of cellulose ethers may be used, such as for example of methylhydroxyethylcellulose with carboxymethylcellulose. Blends of starch ethers may be used, such as for example hydroxyethyl starch with cationic starch and/or carboxymethylated starch. Blends of guar ethers may be used, such as for example hydroxyethylguar with methylguar. Additionally, blends of cellulose ethers with starch ethers and/or guar ethers may be used, such as for example methylhydroxyethylcellulose with hydroxypropylstarch and hydroxypropylguar.

F) Cellulose and starch esters may be used, such as for example cellulose nitrate, acetate, butyrate.

Particularly preferred polysaccharides or polysaccharide derivatives are cellulose derivatives, in particular water- and/or organo-soluble cellulose ethers, such as for example methylcellulose ether (MC), ethylcellulose ether (EC), carboxymethylcellulose ether (CMC) {preferably salts thereof, such as for example sodium carboxymethylcellulose ether}, methylhydroxyethylcellulose (MHEC), methylhydroxypropylcellulose (MHPC), ethylhydroxyethylcellulose (EHEC), ethylhydroxypropylcellulose (EHPC), methylhydroxyethylhydroxypropylcellulose (MHEHPC), hydroxyethylcellulose (HEC) and hydroxypropylcellulose (HPC) as well as reaction products of the above-recited cellulose ethers with reagents which contain long-chain linear or branched alkyl groups with $C_2$ to $C_{18}$ carbon atoms or arylalkyl groups with $C_7$ to $C_{15}$ carbon atoms.

The proportion of cellulose ether used in the building material compositions of the present invention is typically dependent upon the particular area of application and intended use. Typically, the building material compositions of the present invention contain cellulose ether in an amount of from 0.01 wt. % to 50 wt. %, preferably from 0.01 wt. % to 10 wt. %, based on the total quantity of dry solids of the building material composition.

As is known to the skilled artisan, cellulose ethers are not typically used alone in the formulations, but instead along with a range of additives and/or modifiers, in order to, for example, improve certain effects during processing. The cellulose ethers used in the building material compositions of the present invention (e.g., renders, tile adhesives, filler compositions and others) may accordingly be blended with, for example, hydrocolloids, polymer dispersion powders, defoamers, swelling agents, fillers, light additives, polyacrylates, polyacrylamides, hydrophobing agents, air-entraining additives, synthetic thickeners, dispersion auxiliaries, deflocculants and/or retarding agents or retarding agent mixtures and/or accelerators and/or stabilisers. Typical fillers include, for example, inter alia, quartz sand, dolomite, limestone sand, calcium sulfate dihydrate or the flours thereof.

Building material compositions, based on gypsum, hydrated lime and cement, are typically of the following composition (in which all wt. %'s are based on total dry weight):

| | |
|---|---|
| 99.99–1 wt. % | gypsum, hydrated lime, cement or hydrated lime/cement; |
| 0.001–5 wt. % | cellulose ethers |
| 0–90 wt. % | quartz sand or limestone sand; |
| 0–10 wt. % | polymer dispersion powder; |
| 0–10 wt. % | clarification additives |
| 0–1 wt. % | hydrophobing agent; |
| 0–0.5 wt. % | starch ether; and |
| 0–0.1 wt. % | air-entraining agent. |

Water is typically added to the building material compositions of the present invention, until the desired consistency has been achieved. The nature, composition and processing of building material compositions are generally known to the skilled artisan. See, for example, Wolff Walsrode AG product brochure, "Walocel® M—Methylcellulosen für Putz- und Mauermörtel", February 1996.

The nature and proportion of the particular auxiliary substances or admixtures are generally known to the person skilled in the art. There is, however, no restriction to the above-stated additions. Depending upon applicational requirements, the render system may contain further additives. See also in this connection: I. Schrage in Ullmanns Enzyklopädie der technischen Chemie, vol. 9, Verlag Chemie, Weinheim, New York, 1974, pp. 312 et seq. and the literature cited therein as well as, for example, DE-A-19 541 945; DE-A-19 543 933; EP-A-0 458 328; and U.S. Pat. No. 5,047,086.

The present invention is more particularly described in the following examples, which are intended to be illustrative only, since numerous modifications and variations therein will be apparent to those skilled in the art. Unless otherwise specified, all parts and percentages are by weight.

EXAMPLES

The following Examples represent non-limiting embodiments of the invention. The building material compositions prepared from particulate cellulose ethers prepared in accordance with the present invention, are in each case compared with building material compositions containing conventional commercial methylhydroxyethylcellulose.

The designations "DS" (average degree of substitution) and "MS" (molar degree of substitution") have the meaning known to the person skilled in the art in relation to the cellulose ethers used in accordance with the present invention and mentioned below by way of example. The term "DS" designates the average number of substituted hydroxyl groups in the cellulose per anhydroglucose unit. The term "MS" characterizes the average number of moles of the reactants combined with the cellulose per anhydroglucose unit.

In the Examples stated below, viscosities of 2 wt. % aqueous solutions in distilled water were determined using a Haake model RV 100 rotational viscosimeter, system M 500, measuring device MV, in accordance with DIN 53 019, at a shear rate of D=2.5 s$^{-1}$, and a temperature of 20° C.

In these building material compositions described in the examples below, methylhydroxyethylcellulose ethers (MHEC) are always used as the cellulose ethers. The methylhydroxyethylcellulose ethers used according to the invention exactly match the particular reference sample with regard to the type of production (alkalisation, etherification, purification) and with regard to substitution (DS-methyl and MS-hydroxyethyl). In contrast with the reference samples, the methylhydroxyethylcellulose ethers used in accordance with the present invention are swollen and/or dissolved in the manner described previously herein with 65 to 78 wt. % of water, based on total weight. The water from the swollen and/or dissolved cellulose ether is then converted into the vapour phase, and the dissolved and/or swollen cellulose ether is converted into the solid state in the form of finely divided solid particles in a high rotary speed, gas stream impact mill by the gas stream of a superheated steam/inert gas mixture or steam/air mixture having a steam content of 40 to 99 wt. %, based on the total weight of the steam/inert gas mixture or steam/air mixture. The resultant solid particles are separated from the gas stream and dried.

As used in the Examples, percentages are weight percentages. The terms "min" and "s" denote minutes and seconds respectively; the term "rpm" denotes "revolutions per minute". The terms "DS-Me" and "MS-HE" designate the level of substitution by methyl and hydroxyethyl groups. The abbreviations "PP" and "PF" designate the fineness of grind of the product used, and more particularly denote ultrafine powder ("PP"), and fine powder ("PF"). The grading curves are mentioned in each case by way of example.

The designations "WRV" and "WRV change" respectively designate the level of water retention capacity and reduction in water retention capacity in percentage points when the temperature is increased from 20° C. to 40° C.

The water/solids factor (W/S) is defined as follows: W/S=Water flow rate/(wet mortar flow rate–water flow rate). See, for example, Wolff Walsrode AG product brochure, "Walocel® M—Methylcellulosen für Putz- und Mauermörtel", February 1996.

The grading curves are determined by screening the particulate cellulose ethers with a screening machine with screens to DIN 4188. Screens with a mesh size of 0.25 mm, 0.20 mm, 0.16 mm, 0.125 mm, 0.100 mm and 0.063 mm are used.

The composition of the building material compositions mentioned in the Examples are summarized in Table 1. The values recited therein are parts by weight.

TABLE 1

The building material compositions evaluated in the Examples herein.

| Nature of components | Lime cement render | Tile adhesive | Cement extrusion |
| --- | --- | --- | --- |
| Portland cement | 1000 | 400 | 2000 |
| Hydrated lime | 900 | — | — |
| Quartz sand | 700 | 585 | 2000 |

TABLE 1-continued

The building material compositions evaluated in the Examples herein.

| Nature of components | Lime cement render | Tile adhesive | Cement extrusion |
| --- | --- | --- | --- |
| Cellulose ether[a] | 9 | 40 | 18 |
| Hydrophobing agent | 20 | — | — |
| Air-entraining agent | 2.0 | — | — |
| Cellulose fibres | — | — | 200 |
| Polymer dispersion powder | — | 15 | — |

[a]Particulate cellulose ether prepared in accordance with the present invention, or comparative particulate cellulose ether.

Lime Cement Render Building Material Compositions:

The lime cement render tests are conducted using Portland cement with the designation CEM I 32.5R, Höver works, from Alsen-Breitenburg, the sand used is quartz sand of fineness F34 from Quarzwerke Frechen, and hydrated lime from Dyckerhoff. The air-entraining agent used is the product LP-W-1®, Wolff Walsrode AG; zinc stearate from Greven Fettchemie is the hydrophobing agent. The products are blended with the cellulose ethers mentioned in Table 1 and described below. Consistency is determined by measuring slump to DIN 18555, part 2. The cellulose ether used as the comparison standard is the product Walocel® MKX 60000 PF01, Wolff Walsrode AG. Water retention capacity is determined to DIN 18555, part 7. The water/solids factor is adjusted to 0.21 and the render is investigated in accordance with the test methods shown below.

Tile Adhesive Building Material Compositions:

The tile adhesive tests are conducted using the polymer dispersion powder Elotex WS 45® from Elotex AG. The Portland cement used for the testing in tile adhesives has the designation CEM I 42.5R, Lägerdorf works, from Alsen-Breitenburg. The sand used in this case is quartz sand of fineness F34 from Quarzwerke Frechen. The cellulose ether used as the comparison standard is the product Walocel® MKX 40000 PP01, Wolff Walsrode AG. The quantities of dry solids stated in Table 1 are weighed out in a plastic bag and homogeneously mixed by hand for approx. 5 minutes by repeated shaking, wherein any lumps of cement are first crushed. Using the quantities recited in Table 1, a water/solids factor of 0.23 is established by adding water and the resultant tile adhesive is investigated in accordance with the test methods shown below.

Cement Extrusion Building Material Compositions:

The cement extrusion tests are conducted using Portland cement with the designation CEM 1 32.5, Höver works, from Alsen-Breitenburg and quartz sand of fineness W12 from Quarzwerke Frechen is used as the sand. The cellulose fibers used are Arbocel® BWW 40 from Rettenmaier & Söhne. The cellulose ether used as the comparison standard is the product Walocel® VP-M-20678, Wolff Walsrode AG. The extrusion tests are performed using a model M20 MK Lödige mixer from Lödige, and a model PZ VM8D semi-technical extruder from Händle. The extrudates are produced by introducing the quantity of dry solids stated in the formulation into the Lödige mixer. Once the dry mixture has been homogeneously mixed [4 min, 250 rpm], the quantity of warm water (T=35° C.) required to achieve a water/solids factor of 0.31 is sprayed in at 4.0 bar and the batch further mixed for a duration of 2×2.5 min at 250 rpm. The resultant mixture is then immediately transferred into the extruder. The extruder settings are fixed for all subsequent tests on the basis of the extrusion tests performed with the reference sample (10 mm perforated insert; rotational speed, prepress:

12 rpm; rotational speed, screw press: 15 rpm; preheating and pressing head 40° C.; prepress: screw with spider outside top: 20 mm or outside below: 20 mm; position of pointed tip screw: normal; no pressing head reduction; vacuum: 0.8 bar). The extrudates are investigated in accordance with the test criteria described below.

Table 2 summarizes the product parameters of the cellulose ethers which were used as comparison samples in the Examples described further below.

TABLE 2

Product parameters of the cellulose ethers used for comparison purposes.

| Product designation[1] | DS-Me | MS-HE | Viscosity (mPa · s) |
|---|---|---|---|
| Walocel ® MKX 60000 PF01 | 1.57 | 0.27 | 57740 |
| Walocel ® MKX 40000 PP01 | 1.59 | 0.29 | 38600 |
| Walocel ® VP-M-20678 | 1.47 | 0.28 | 92330 |

[1]Commercially available products of Wolff Walsrode AG

Results of Lime Cement Render Tests:

Testing of the cellulose ethers used in the compositions of the present invention with regard to rendering was performed by comparison with the reference sample Walocel® MKX 60000 PF01 (=commercial product of Wolff Walsrode AG). The viscosities of the methylhydroxyethylcellulose ethers used in the present invention in comparison with the standard are recited in Table 3, and are all at a similarly high level.

TABLE 3

Product parameters of the methylhydroxyethylcellulose ethers used.

| No. | Sample | Viscosity (mPa · s) |
|---|---|---|
| 1 | Walocel ® MKX 60000 PF 01[1] | 57740 |
| 2 | Sample 1 according to the invention | 59215 |
| 3 | Sample 2 according to the invention | 62161 |
| 4 | Sample 3 according to the invention | 59804 |

[1]Reference sample (= comparative sample)

The results of the screen analyses are shown in Table 4.

TABLE 4

Comparison of screen analyses.

| No. | Sample | Screen fractions (%)[2] | | | | | |
|---|---|---|---|---|---|---|---|
| | | <0.25 mm | <0.20 mm | <0.16 mm | <0.125 mm | <0.100 mm | <0.063 mm |
| 1 | Walocel ® MKX 60000 PF01[1] | 99.90 | 99.95 | 94.79 | 85.03 | 74.75 | 47.23 |
| 2 | Sample 1 according to the invention | 99.84 | 99.62 | 98.79 | 93.20 | 83.83 | 50.15 |
| 3 | Sample 2 according to the invention | 98.59 | 95.20 | 88.18 | 76.25 | 61.77 | 29.29 |
| 4 | Sample 3 according to the invention | 99.24 | 94.85 | 87.51 | 74.54 | 58.46 | 23.23 |

[1]Reference sample (= comparative sample)
[2]Grading curve by screening through screens of mesh sizes 0.25 mm; 0.20 mm; 0.16 mm; 0.125 mm; 0.100 mm; 0.063 mm The results of the testing are summarized below. Sample No. 2 corresponds to the reference product with regard to granulometry. All the other samples have distinctly smaller ultra-fine particulate content.

The results of applicational testing of the lime cement render compositions are summarized in Table 5.

TABLE 5

Applicational results for lime cement render compositions.

| No. | Sample | Slump[2] (mm) at T = | | Water retention[3] (%) at T = | | WRV change (%)[4] |
|---|---|---|---|---|---|---|
| | | 20° C. | 40° C. | 20° C. | 40° C. | |
| 1 | Walocel ® MKX 60000 PF 01[1] | 166 | 160 | 97.46 | 96.49 | 0.97 |
| 2 | Sample 1 according to the invention | 169 | 163 | 97.65 | 97.17 | 0.48 |
| 3 | Sample 2 according to the invention | 169 | 163 | 97.64 | 97.04 | 0.60 |
| 4 | Sample 3 according to the invention | 162 | 162 | 97.41 | 96.72 | 0.69 |

[1]Reference sample (= comparative sample)
[2]Slump adjusted to 160 mm ± 5 mm
[3]Determined after 5 minutes; overall deviation approx. ± 0.1%
[4]Change in water retention for T = 20° C. and T = 40° C.

Relative to the comparative example, sample numbers 2–4, which are representative of building material compositions according to the present invention, have distinctly higher water retention values, especially at particularly critical temperatures of 40° C. Since it is generally expected that the level of water retention in the render may be affected by the ultra-fine particulates content, it was expected that samples numbers 3–4 should have exhibit distinctly poorer water retention values, in particular at temperatures of 40° C.

Results of Tile Adhesive Tests

Testing of the particulate cellulose ethers used in the compositions of the present invention with regard to tile adhesives was performed by comparison with the reference sample Walocel® MKX 40000 PP01 (=commercial product of Wolff Walsrode AG). The results are discussed below. In Table 6 the viscosities of the samples are summarized.

TABLE 6

Viscosities of the products used for tile adhesive testing.

| Sample | Viscosity (mPa · s) |
|---|---|
| Walocel ® MKX 40000 PP 01[1] | 38600 |
| Sample 4 according to the invention | 38003 |
| Sample 5 | 37414 |

[1]Reference sample (= comparative sample)

The samples are highly mutually comparable with regard to their viscosity yields. No significant differences are recorded. The grading curves of the products also exhibit virtually identical values, as summarized in the following Table 7.

TABLE 7

Comparison grading curves of cellulose ethers used in tile adhesive building material compositions.

| Sample | Screen analysis (%)[2] | | | | | |
|---|---|---|---|---|---|---|
| | <0.250 mm | <0.200 mm | <0.160 mm | <0.125 mm | <0.100 mm | <0.063 mm |
| Walocel ® MKX 40000 PP01[1] | 100 | 99.9 | 99.5 | 97.3 | 91.9 | 61.8 |
| Sample 4 according to the invention | 99.7 | 99.0 | 95.7 | 89.1 | 80.2 | 54.5 |

TABLE 7-continued

Comparison grading curves of cellulose ethers used in tile adhesive building material compositions.

| Sample | Screen analysis (%)[2] | | | | | |
|---|---|---|---|---|---|---|
| | <0.250 mm | <0.200 mm | <0.160 mm | <0.125 mm | <0.100 mm | <0.063 mm |
| Sample 5 according to the invention | 100 | 99.9 | 99.4 | 95.5 | 89.6 | 68.4 |

[1]Reference sample (= comparative sample)
[2]Grading curve by screening through screens of mesh sizes 0.25 mm; 0.20 mm; 0.16 mm; 0.125 mm; 0.100 mm; 0.063 mm Further testing concentrated on the following points.

Sag Resistance, Shear Resistance and Mixing Behavior:

To this end, the tile adhesive is introduced into a beaker and the appropriate quantity of water added thereto. After actuating a stopwatch, the contents are then thoroughly stirred for 30 s with a wooden rod. The sag resistance of the tile adhesive is then visually assessed on the wooden stirrer, which has been lifted out of the mixture. Complete sag resistance, where the tile adhesive does not move on the wooden stirrer, corresponds to a rating of 100% sag resistance; a value of <80% means, for example, that the adhesive is of too thin a consistency and may no longer sensibly be applied onto the wooden rod. 5 min after the beginning of mixing, the sample is thoroughly stirred for a further 1 min and sag resistance (=shear resistance) is assessed for a second time.

Evaluation of Shear Resistance and Mixing Behaviour

The evaluation of the mixing behaviour of the cellulose ethers formulated in Table 6 is identical in every instance (=97.5% sag resistance). The samples may be mixed normally and exhibit constantly increasing thickening action. The sag or shear resistance values after 30 s and the evaluation of mixing behaviour after 5 and 6 minutes are identical in every instance. Shear resistance after 6 minutes is at an identical level in every instance. No differences are recorded.

Further parameters which are verified included:

Collapse:

This test assesses the compressibility of adhesive ridges as a function of the quantity of water used for mixing by placing a 10×10 cm glass sheet onto tile adhesive which has been applied by comb. Once a weight has been applied, the compressibility of the tile adhesive ridges is determined by the degree of wetting of the glass sheet. To this end, the tile adhesive is mixed as described above and sag resistance after 30 s and shear resistance after 5 min are determined. After 7 min, the tile adhesive is placed onto a 10×10 cm acrylic sheet and any surplus removed with a comb spreader (6×6 mm; angled at 60°). The stopwatch is then zeroed. 10 min after application by comb, the glass sheet is laid upon the adhesive such that both outer edges rest upon the middle of a ridge. A weight of 2.21 kg is immediately placed upon the middle of the sheet for 30 s. Wetting of the applied glass sheet, measured with a ruler or a gridded film, is stated in percent.

Slippage Resistance:

In order to determine the slippage resistance of the tile adhesive, the latter is applied by comb (comb spreader 4×4 mm) onto a slippage plate (height: 220 mm; 200×250 mm; material: PVC). Then, using a weighed tile and additional weights (50 g weights), the maximum weight of a tile (10×10 cm stoneware tile; 200 g) which is just still held by the adhesive is determined. The values stated are the slippage of the tiles after 30 s without additional weight in mm or the maximum tile weight in grams per cm² (g/cm²).

Open Assembly Time:

The open assembly time is determined by measuring the period during which it is possible to lay tiles in a bed of tile adhesive applied by comb. Tiles are laid after a defined time (5/10/15/20/25/30 min) into a tile adhesive applied by comb and are subsequently removed. The degree of wetting of the reverse of the tiles is then evaluated. Testing is performed by placing 100 g of tile adhesive into a 200 mL beaker. A defined quantity of water is added. The stopwatch is started and the beaker contents are then stirred for 1 min, left to stand for 3 min and stirred for a further 1 min. The tile adhesive is then applied onto an Eternit asbestos cement sheet [40×20 cm] and combed with a comb spreader [4×4 mm]. The stopwatch is zeroed. After a further 5 min, the first tile is laid and a 3 kg weight placed thereon for 30 s. At 5 min intervals, further tiles are laid and likewise exposed to a 3 kg load. After 40 min, all the tiles are lifted and turned over. The degree of wetting of the reverse of the tiles with tile adhesive is measured with a gridded film and stated in percent (rounded to 5%). The stated open assembly time is the time in min at which values of $\geq 50\%$ adhesive are observed on the reverse of the tiles.

Tensile Bond Strengths:

Tensile bond strengths were determined on exposure to standard, hot and wet conditions and exposure to freeze/thaw cycles to EN 1348.

Setting Time:

The course of setting from mixing of a tile adhesive via the onset of setting and to the end of setting is tested. The principle of the test is that setting time is determined by the penetration of a needle (automatic Vicat penetrometer) into the tile adhesive. For the purposes of testing, the water/solids factor is first determined or established. At least 400 g of the tile adhesive to be tested are mixed by hand for 1 min with the quantity of water to be measured and immediately placed, entraining as few air bubbles as possible, with gentle rodding into a previously greased hard rubber cone (height: 40 mm). The surface is then flattened off without pressure with a wide spatula using a sawing motion. Before the surface of the specimen is covered with white mineral oil (type P 420), an approx. 0.5 cm thick layer of tile adhesive is applied to the outer periphery to prevent the oil from running off. The oil prevents skinning and adhesion of tile adhesive to the test needle. The cone is placed with the larger opening downwards onto a previously greased glass sheet (diameter: 120 mm). The glass sheet, which has been filled by the cone, is placed on the stand base of the Vicat container. Measurement is performed until the tile adhesive has completely set and needle penetration is at most 1 to 2 mm. The intervals between measurements are selected continuously between 5, 10 and 15 min depending upon the duration of setting time. The depth of needle penetration as a function of time indicates the onset of setting when the needle no longer falls through the 40 mm deep tile adhesive slurry. Setting is complete when the needle penetrates at most to a depth of 1 to 2 mm into the tile adhesive slurry. The stated result is setting time with onset and end of setting in hours and minutes.

Table 8 summarizes the tile adhesive test results.

TABLE 8

Results of tile adhesive tests.

| Sample | Unit | No. 1 | No. 2 | No.3 |
|---|---|---|---|---|
| MKX 40000 PP 01 (reference sample) | % | 100 | — | — |

TABLE 8-continued

Results of tile adhesive tests.

| Sample | Unit | No. 1 | No. 2 | No.3 |
|---|---|---|---|---|
| Sample 4 according to the invention | % | — | 100 | — |
| Sample 5 according to the invention | % | — | — | 100 |
| Water/solids factor | — | 0.23 | 0.23 | 0.23 |
| Collapse | % | 96 | 96 | 96 |
| Wetting | | | | |
| Slippage test | | | | |
| after 30 s | mm | 1.4 | 1.0 | 1.0 |
| total weight | g | 50 | 50 | 50 |
| max. tile weight | g/cm$^2$ | <2.0 | <2.0 | <2.0 |
| Open assembly time, laid after: | | | | |
| 5 min | % | 90 | 90 | 90 |
| 10 min | % | 70 | 60 | 55 |
| 15 min | % | 55 | 40 | 40 |
| 20 min | % | 30 | 20 | 35 |
| 25 min | % | 15 | 10 | 15 |
| 30 min | % | trace | trace | trace |
| Tensile bond strength to EN 1348 | | | | |
| Exposure to standard conditions | N/mm$^2$ | 1.55 | 1.74 | 1.81 |
| Exposure to hot conditions | N/mm$^2$ | 0.28 | 0.63 | 0.73 |
| Exposure to water | N/mm$^2$ | 1.22 | 1.23 | 1.41 |
| Exposure to freeze/thaw cycles | N/mm$^2$ | 0.60 | 0.64 | 0.97 |
| Vicat setting time | | | | |
| Onset after | h:min | 12:15 | 10:30 | 10:45 |
| End after | h:min | 15:15 | 13:30 | 14:00 |
| Duration | h:min | 03:00 | 03:00 | 03:15 |

At an identical water/solids factor and similar open assembly times, in tile adhesives the particulate cellulose ethers used in the compositions of the present invention exhibit advantages with regard to tile slippage and improved tensile bond strengths, wherein higher strengths are in particular recorded on exposure to hot conditions (tiles exposed to temperatures of 70° C.) which are deemed particularly critical.

The cellulose ethers used in the compositions of the present invention also accelerate the onset of setting of the tile adhesives. The tile adhesives formulated therewith all set approx. 1–2 h faster in comparison with the reference sample, as a result of which tiles are more rapidly ready for finishing or foot traffic. The duration of the setting process from onset of setting to end of setting is comparable in all instances at approx. 3 hours.

Results of Cement Extrusion Tests

Testing with regard to cement extrusion was performed with the particulate cellulose ethers used in the compositions of the present invention. The reference sample used was Walocel® VP-M-20678 (=commercial product of Wolff Walsrode AG).

The viscosities of the methylhydroxyethylcellulose ethers used in the compositions of the present invention in comparison with the standard are summarized in Table 9, and are all at a comparable level.

TABLE 9

Viscosities of the methylhydroxyethylcellulose ethers used.

| No. | Sample | Viscosity (mPa · s) |
|---|---|---|
| 1 | Walocel ® VP-M-20678[1] | 92330 |
| 2 | Sample 6 according to the invention | 96330 |
| 3 | Sample 7 according to the invention | 93090 |
| 4 | Sample 8 according to the invention | 93980 |

[1]Reference sample (= comparative sample)

The results of the screen analyses are shown in Table 10.

TABLE 10

Comparison of screen analyses.

| | | Screen fractions (%)[2] | | | | | |
|---|---|---|---|---|---|---|---|
| No. | Sample | <0.25 mm | <0.20 mm | <0.16 mm | <0.125 mm | <0.100 mm | <0.063 mm |
| 1 | Walocel ® VP-M-20678[1] | 99.98 | 99.92 | 95.38 | 87.08 | 75.24 | 49.64 |
| 2 | Sample 6 according to the invention | 99.74 | 99.32 | 98.32 | 94.83 | 79.04 | 55.48 |
| 3 | Sample 7 according to the invention | 99.46 | 98.69 | 96.63 | 91.44 | 73.93 | 50.32 |
| 4 | Sample 8 according to the invention | 99.36 | 98.23 | 95.39 | 88.00 | 76.68 | 52.69 |

[1]Reference sample (= comparative sample)
[2]Grading curve by screening through screens of mesh sizes 0.25 mm; 0.20 mm; 0.16 mm; 0.125 mm; 0.100 mm; 0.063 mm The cellulose ethers used in the building material compositions of the present invention, and designated as numbers 2–4 in Table 10, differ only immaterially with regard to granulometry in comparison with the reference sample used and are accordingly very readily comparable with the standard.

The procedure used to produce the mixture and extrudates is described above. Over the test periods of 2–13 minutes in each case, various machine parameters on the extruder are recorded under computer control (compression pressure, discharge rate of the extrudate, electric power consumption of prepress and screw press, temperature of pressing head and cylinder, vacuum). No variations of any kind are observed in comparison with the reference sample.

Evaluation of the extrudate concentrates on the visual appearance of the mouldings and the wet bulk density of the extruded material was undertaken. The results of this evaluation are summarized in Table 11.

TABLE 11

Applicational results of extrusion tests.

| No. | Sample | Wet weight (g) | Wet bulk density (g/mL) | Evaluation of extrusion | Time to first cracking |
|---|---|---|---|---|---|
| 1 | Walocel ® VP-M-20678[1] | 512 | 1.86 | flocculent structure, relatively large cracks from 13 min 30 s | 11 min 40 s |
| 2 | Sample 6 according to the invention | 548 | 1.88 | initially somewhat poorer than no. 1, but then as 1; fewer poor areas than no. 1; overall somewhat better than no. 1, smoother | 12 min 30 s |

TABLE 11-continued

Applicational results of extrusion tests.

| No. | Sample | Wet weight (g) | Wet bulk density (g/mL) | Evaluation of extrusion | Time to first cracking |
|---|---|---|---|---|---|
| 3 | Sample 7 according to the invention | 501 | 1.87 | initially as no. 1; smooth surface; relatively small cracks from 12 min 55 s; somewhat poorer than no. 2, but better than no. 1 | 11 min 50 s |
| 4 | Sample 8 according to the invention | 462 | 1.90 | initially poorer than no. 3 (more uneven surface), then becoming continuously better with virtually no holes; overall best sample | 13 min |

[1])Reference sample (= comparative sample)

Overall, the extrusion mouldings produced with the cellulose ethers, in accordance with the present invention, received a distinctly better evaluation in comparison with the comparative sample. Better plastification and less cracking of the extrudates may be achieved with the cellulose ethers used in the compositions according to the present invention. This means improved processing reliability for the user, as the time until the first cracking occurs may be distinctly increased when using the building material compositions according to the present invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A building material composition prepared from a particulate material selected from the group consisting of particulate polysaccharides and particulate polysaccharide derivatives, wherein the particulate material is prepared by a method comprising:
   (a) forming a feed composition comprising a member selected from the group consisting of polysaccharides and polysaccharide derivatives, and 35 wt. % to 99 wt. % of water, based on the total weight of the feed composition, wherein said member is at least one of swelled and dissolved in the feed composition;
   (b) contacting, in a mill, the feed composition with a gas stream, thereby converting simultaneously the water of said feed composition into water vapor, and said member of said feed composition into a solid state form of finely particulate material;
   (c) separating the particulate material from the gas stream; and
   (d) optionally drying the particulate material, wherein the particulate material contains, in each case based on the total weight of the particles, less than 5 wt. % with a particle size smaller than 15 $\mu$m, less than 2 wt. % with a particle size smaller than 10 $\mu$m, and less than 1 wt. % with a particle size smaller than 5 $\mu$m.

2. The building material composition of claim 1 wherein said feed composition comprises from 50 wt. % to 80 wt. % of water, based on the total weight of the feed composition; said mill is a high rotary speed, gas stream impact mill; and said gas stream is a superheated stream of steam comprising a mixture selected from the group consisting of steam and an inert gas, and steam and air, said superheated stream of steam having a steam content of from 40 wt. % to 99 wt. %, based on the total weight of the superheated stream of steam.

3. The building material composition of claim 1 wherein the polysaccharide derivative is selected from the group consisting of polysaccharide ester, polysaccharide ether and mixtures thereof.

4. The building material composition of claim 3 wherein the polysaccharide ether is selected from the group consisting of cellulose ether, starch ether, guar ether and mixtures thereof.

5. The building material composition of claim 3 wherein the polysaccharide ester is selected from the group consisting of cellulose ester, starch ester and mixtures thereof.

6. The building material composition of claim 1 wherein said building material composition is selected from the group consisting of manually or mechanically applied renders, tile adhesives, floor levelling compositions, jointing fillers, mortars, spraycrete compositions, screeds, cement or lime/sandstone extrudates, filler compositions or distempers, silicate paints, mineral paints and emulsion paints.

7. The building material composition of claim 1 wherein said member is present in said feed composition in an amount totaling from 1 wt. % to 65 wt. %, based on the total weight of the feed composition.

8. The building material composition of claim 2 wherein said member is present in said feed composition in an amount totaling from 20 wt. % to 50 wt. %, based on the total weight of the feed composition.

* * * * *